United States Patent [19]

Orloff

[11] 3,922,529

[45] Nov. 25, 1975

[54] STATIC READER FOR ENCODED RECORD

[75] Inventor: Leslie M. Orloff, Huntington, N.Y.

[73] Assignee: Kenilworth Research & Development Corporation, Mineola, N.Y.

[22] Filed: Feb. 1, 1974

[21] Appl. No.: 438,675

[52] U.S. Cl. ................ 235/61.11 H; 235/61.11 A; 235/61.7 B; 61.12 N

[51] Int. Cl.[2] ...................... G06K 7/06; G06K 19/06

[58] Field of Search ........... 235/61.12 C, 61.11 A, 235/61.11 H, 61.7 B; 340/173 SP, 149 A

[56] References Cited

UNITED STATES PATENTS

| | | | |
|---|---|---|---|
| 3,678,251 | 7/1972 | Delpino | 235/61.12 C |
| 3,719,804 | 3/1973 | Illing | 235/61.11 H |
| 3,728,523 | 4/1973 | Torok | 235/61.12 C |
| 3,794,813 | 2/1974 | Spetz | 235/61.7 B |
| 3,812,461 | 5/1974 | Lemelson | 235/61.7 B |
| 3,816,711 | 6/1974 | Bliss | 235/61.11 A |
| 3,818,187 | 6/1974 | Lovendusky | 235/61.7 B |
| 3,821,518 | 6/1974 | Miller | 235/61.7 B |
| 3,831,119 | 8/1974 | Ambrosio | 235/61.11 C |

FOREIGN PATENTS OR APPLICATIONS

| | | | |
|---|---|---|---|
| 45-21739 | 7/1970 | Japan | 235/61.12 C |

*Primary Examiner*—Stanley M. Urynowicz, Jr.
*Attorney, Agent, or Firm*—Darby & Darby

[57] ABSTRACT

A decoder for use with a record medium having bits of information thereon in which the decoder can be programmed to produce an indication of an acceptable record having the bits of information thereon in a predetermined pattern corresponding to predetermined information.

17 Claims, 4 Drawing Figures

STATIC READER FOR ENCODED RECORD

In the application of Gerald Kron, Ser. No. 373,862, filed June 26, 1973, a record medium and the method of making the same is disclosed in which the medium is in the form of a card or ticket having one or more pieces or "bits" of information thereon in a pattern corresponding to predetermined binary or alphanumeric information. The bits of information on the record are conductive in nature and the pattern in which they are impressed can correspond, for example, to a binary number, letter, a name, etc.

The present invention is directed to a decoder incorporating novel electronic circuitry for reading records of the aforementioned type and, more particularly, to read them in a manner such that an indication can be produced when the information on the record has a pattern indicating a predetermined type of information, for example, a predetermined number.

A record using conductive bits of information, although not of the same construction or made by the same process as the record of the aforesaid Kron application, is disclosed in U.S. Pat. Nos. 3,736,368 and 3,736,369 as is a decoder for utilizing these records. In the aforesaid patents, the decoder is of the type wherein an oscillator of a predetermined frequency is utilized having two physically spaced-apart sensing plates forming the capacitor of its resonant tuning circuit. When the record is properly placed with the conductive bit of information between the two plates, the frequency of the oscillator is changed due to the change in capacity of the resonant circuit capacitor. The change of frequency is detected and used. In particular, both of the aforesaid patents use the frequency shift to operate an unscrambler associated with a pay television device. In general, the decorders of these patents operate with the sensing plates in fixed patterns and there is no simple way to utilize them to read a binary number or other type of information represented by a number of bits. For example, where a number of bits of information have to be detected a plurality of oscillators would have to be used and separate frequency detecting means provided for each oscillator. As an alternative to this all bits would have to contribute to a certain frequency change, and a frequency discriminator would have to be provided.

The decoder of the present invention has greater flexibility and utility and is considerably simpler than the decoders of either of the aforesaid patents. Rather than using a change in oscillator frequency to determine the presence of a bit of information, the decoder utilizes a novel circuit arrangement whereby the bits of information on the record couple energy to individual detector units so that the bits can be individually sensed. A logic circuit is also provided which can be set to a predetermined information quantum, or "number, " that is, a certain spatial pattern of a predetermined number of bits of information on the record, so that the acceptance of a record having the proper predetermined information can be readily determined.

It is therefore an object of the present invention to provide a decoder for use with a record of the type having bits of information thereon in a predetermined pattern.

A further object is to provide a decoder for a record having bits of information thereon which can be set to be actuated only in response to the occurrence of a predetermined pattern of said bits on the record.

Another object is to provide a decoder for a record utilizing a novel circuit arrangement in which the bits of information on the record couple information to individual detector circuits.

Other objects and advantages of the present invention will become more apparent upon reference to the following specification and annexed drawings in which.

Figure 1:
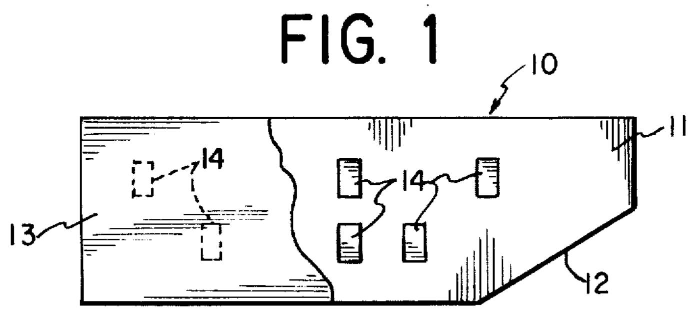
FIG. 1 is a plan view of a typical record of the type utilized with the decoder of the subject invention.

Referring to FIG. 1, a record 10 which can be utilized with the decoder is shown generally in the form of a ticket of rectangular shape with a notched end portion 12 used for alignment purposes in the decoder with respect to a decoder sensing plate. As should be understood, the record can be of any size, or shpae. For example, it can be rectangular, square, or of the shape and size of a credit card, etc. Instead of using the notched portion 12 for alignment, notches or holes can be provided on the record to mate with corresponding holes or pegs in the decoder. It should further be understood that the record does not thave to have any aligning means thereon. All that is required is that it be placed in the proper orientation in a holder adjacent the decoder sensing plate.

The record 10 includes a substrate 11 and a protective coating 13. A plurality of bits of information 14 are shown on the substrate 11. The bits are of conductive material as explained in the aforesaid Kron application. These bits are shown as being generally rectangular in shape and are arranged in a predetermined pattern. The bits can be of any other desired shape. In the embodiment being described there are positions on the record for two rows with six bits per row, making a total of twelve bits possible. Any predetermined number of the bits can be laid down. In general, the pattern of the bits corresponds to a binary number. Therefore, if there are twelve bits, the number of possible combinations, or numbers, that are available is $2^{12}$. As is conventional, the bits can be grouped to represent several numbers and/or alphabetic information. It should be understood, of course, that the invention is not limited with respect to any particular number of bits, or columns, or row configuration ob bits on the record.

The substrate 11 of the record is completely covered with the protective coating of film which is shown broken away. The protective coating is preferably opaque to make the bits 14 invisible to the eye. This is described in the aforesaid Kron application. A portion of the coating is shown removed in FIG. 1.

Figure 2:
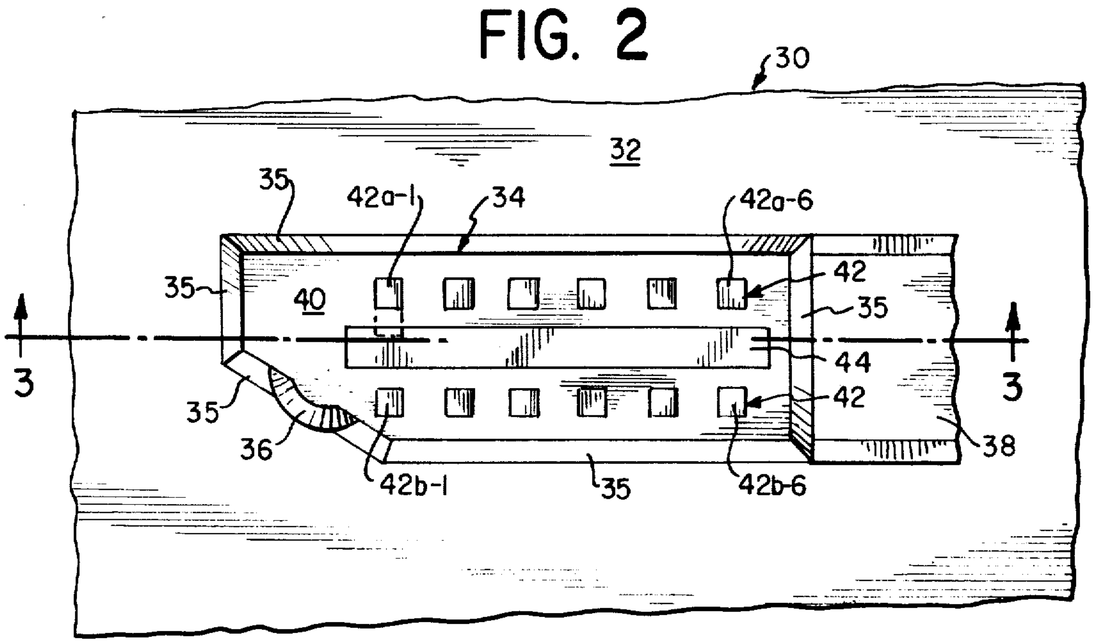
FIG. 2 is a top view of a portion of the decoder showing the sensing plate.
Figure 3:
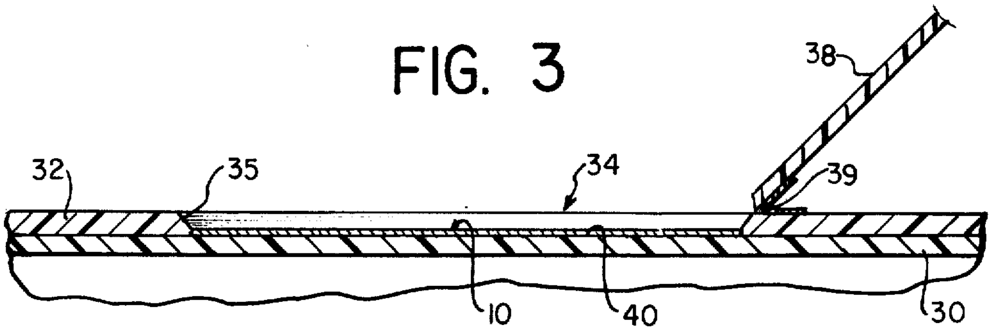
FIG. 3 is a side view, in cross-section of the decoder housing.

FIGS. 2 and 3 show a portion of a housing 30 which holds the circuitry of the decoder. The circuitry utilizes electronic components whose relationship with respect to the housing is not shown since it is not critical to the invention. Only the "nest" for the record 10 is shown. This includes a plate 32 which is mounted on top of the housing. The plate has a cutout 34 therein which is of the same shape as the record 10. The side walls 35 of the cutout, or nest, 34 are chamfered and a thumb nail slot chamfer 36 is also provided to aid in removing the record. Any suitable construction can be used for the nest. For example, the housing 30 terminates short of the edge of the record, that is, its length is shorter than that of the record, so that the end of the record is available to permit removal of the record.

A cover 38 is fastened by a hinge 39 to the plate 32. The cover is of the same shape as the nest 34 so that a record placed within the nest will be covered and pressed down against a portion of a sensor platen 40 which is shown exposed through the cutout in FIG. 2. The cover 38 can have any suitable knob or locking or latching mechanism to hold it in place over the record. Also, the lid can actuate one or more microswitches or magnetic-reed switches when it is closed. The switches are preferably connected in an interlock circuit to prevent the circuit from being activated when the cover is closed and there is no record in the nest. These details are not shown since they are obvious to a person skilled in the art.

The sensor platen 40 which is accessible through the nest cutout 34 is part of a printed circuit board or is a separate board. The remainder of the board, or other board, is not shown since it is within the housing. Terminals (not shown) are provided adjacent the sensing plate for the electronic components which are to be described with respect to FIG. 3.

Sensor plate, 40 has a plurality of individual sensing plates 42 of electrically conductive material thereon to act as the sensors for the bits 14 on a record 10. These sensing plates 42 are each of approximately the same width as a bit of the record and are arranged in an upper row **42*a*-1 through 42*a*-6 and a lower row 42*b*-1 through 42*b*-6. The two rows of plates 42 are located respectively above and below a center electrically conductive strip 44 which extends the length of both rows. If desired, a protective coating can be placed over the sensor platen 40 to obscure the plates 42. The platen 42 and the strip 44** can be printed by conventional printed circuit techniques.

The rows of plates **42*a* and 42*b* are located to match up with a corresponding row of bits 14 on the record. The spacing between the plates 42 and the strip 44 is selected so that energy will not, by itself, couple from strip 44 to the plates. When a record 10 is properly inserted in the nest 34, the possible positions for the upper row of bits 14 on the record 10 will be adjacent the upper row of plates 42*a* and the possible positions for the lower row of bits will be adjacent the lower row of plates 42*b*. A bit 14 present on the record will bridge one of the plates 42*a*, or 42*b* and the strip 44. For example, a bit corresponding to the upper right-hand bit shown on the record 10 of FIG. 1 is also shown in FIG. 2 bridging plates 42*a*-1 and the strip 44. The bit is shown in dotted lines. The spacing between adjacent plates 42** is also selected to prevent coupling of energy from one plate to the other. The plates can be as wide as, or even smaller than, the width of the bits on the record.

The sensor platen 40 operates in the following manner. Energy is fed from a suitable source, such as an oscillator, to the strip 44. When the record is placed in nest 34, a bit on the record will couple energy on strip 44 into the corresponding sensing plate **42*a* and 42*b*** over which it is located. It should be understood that the materials for the substrate and the protective coating enable this to occur. This is explained in the aforesaid Kron application.

Figure 4:
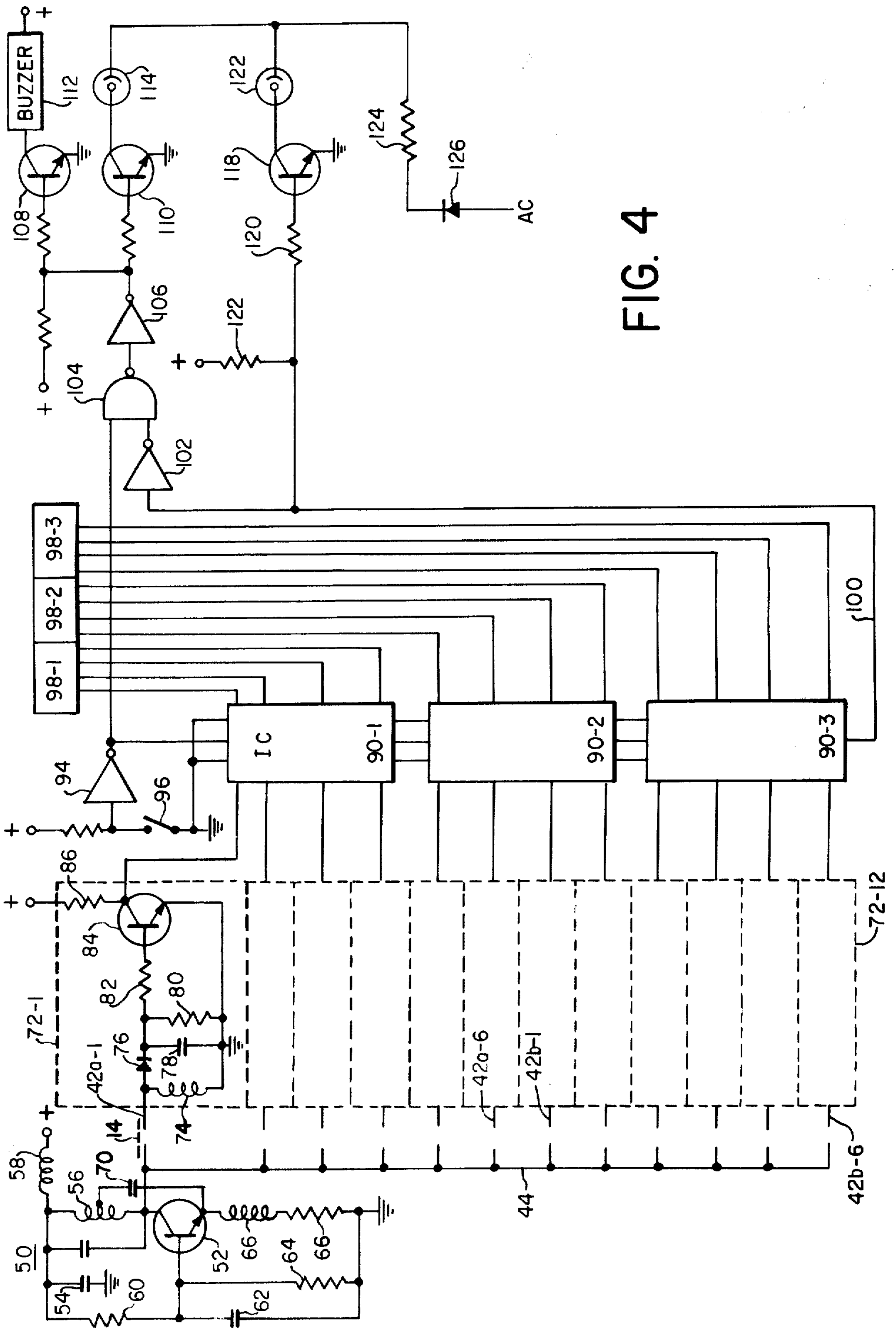
FIG. 4 is a combined schematic and block diagram of the decoder circuitry.

FIG. 4 shows the details of the circuit. The source of energy for the plates 42 of the sensing plate 40 is illustratively shown as on an RF oscillator 50 including a transistor 52, illustratively of the NPN type, having a tuned resonant circuit formed by a capacitor 54 and an inductor 56 connected in parallel. The tuned resonant circuit is connected between the collector of transistor 50 through an RF choke 58 to a point of B+ potential. The base of the transistor is biased from B+ through a resistor 60. A capacitor 62 and resistor 64 are connected between the base and ground to control the biasing potential. The transistor emitter is return to ground through an inductor 66 and resistor 68 in series. A capacitor 70 is tapped from a point on inductor 56 and returned to the emitter. The oscillator components can be selected to produce any desired frequency. One or more of the frequency selective components can be tunable. Also, the oscillator can be crystal controlled. In an illustrative embodiment of the invention, a frequency of approximately 30 Mhz is utilized. The selection of the frequency is determined by a number of factors such as the characteristics of the record substrate and security coating, as well as the composition of the bits, and also the size and spacing of the plates 42 with respect to the center strip 44. Instead of using continuous RF energy, one or more RF pulses can be utilized.

The osciallator output signal is fed to the center conductor 44. For purpose of illustration, conductor 44 has been stretched out so that the sensing plates **42*a*-1 through 42*a*-6 and 42*b*-1 through 42*b*-6 are shown in line along one side of the conductor 44 rather than on each side thereof. It should be understood that this arrangement will work perfectly satisfactorily for a sensor platen from a constructional point of view. Also, several strips 44** can be used with sets of plates adjacent to each one.

Each plate 42 is respectively connected to a detector circuit 72 of similar construction. Since the detectors 72 are all the same, only the circuit connected to plate **42*a*-1 is described. Detector 72 is essentially a peak-type detector. The input includes an inductor 74 which is connected between the respective plate 42 and ground. The inductor 74 is part of a tuned circuit which includes the plate 46*a*, the common strip 44 and the bit on the record, if present. A diode 76 is connected to the upper end of inductor 74 and a parallel RC circuit formed by capacitor 78 and resistor 80 is connected between the diode and ground. The upper end of the RC circuit is connected by a resistor 82 to the base of an NPN transistor 84 whose collector is connected to the potential source through a resistor 86** and whose emitter is grounded.

In operation of the detector, when a bit 14 is present, thereby bridging the space between the strip 44 and a respective plate 42, as shown in FIG. 4 by the dotted line bit 14, the signal from the oscillator is coupled through the bit to the input plate 42 of the detector. The bit, and the record, due to their construction, can be considered to act as a capacitor which serves to tune the inductor 74 to form a resonant circuit at or near the frequency of the signal produced by oscillator 50. That is, the bit couples the oscillator signal from the strip 44 to the plate 42. Voltage will be coupled even if the detector input circuit is somewhat off resonance. This is to say the the coupling action is not highly frequency responsive. However, if no bit is present between the strip 44 and a respective plate 42, energy will not be coupled to the detector.

The energy coupled by the bit to the detector input is rectified by the diode 76 and the RC network 78, 80 to produce a voltage at the base of the transistor 84. This voltage is amplified by the transistor and appears at its collector.

Each of the detectors 72 operates in a similar manner. That is, if there is a bit present between its respective input plate 42 to couple energy from the common line 44, then the detector will have an output. This can be considered a binary 1, or "high" condition. If there is no bit present there will be no output (binary zero or "low").

One or more comparator circuits 90 are provided. These are integrated circuits, of the type designated 7485 and manufactured by Texas Instruments of Dallas, Texas, and essentially are voltage level logic comparators. That is, the comparator will produce an output signal only when the correct voltage logic level is present at each of its inputs. Three comparators 90 are shown and each receives an input from four of the detectors 72. That is, comparator 90-1 receives inputs from detector 72-1 through 72-4; comparator 90-2 has inputs from detectors 72-5 through 72-9 and circuit 90-3 has inputs from detectors 72-9 through 72-12. Depending upon the type of integrated circuit comparator used, it may be capable of handling input signals from fewer or more than four detectors.

The comparators 90 are connected in series and are energized by an amplifier 94 which is turned on and off by a switch 96 connected between the input of amplifier 94 and ground. Switch 96 can be, for example, a magnetically operated reed-type switch or microswitch which closes when cover 38 is moved down to hold the record in a sensing position. Switch 96 also can be operated manually. Inverter 94 goes on to energize the comparators 90. When switch 96 is open the comparators 90 are not energized.

Each comparator 90 also has four inputs respectively controlled by the switches 98-1, 98-2 and 98-3. The complete wiring pattern between the switches and the comparators is not shown. The connections are conventional, as dictated by the comparator (IC) construction so that by setting the various switches, the comparator condition can be set up to determine the pattern of signals which is needed from the detectors 72 before an output signal can be produced. Consider for example, comparator 90-1 which receives input signals from the four detectors 72-1 through 72-4. These in turn correspond to the bits on the record which are at the sensor plates **42*a*-1 - 42*a*-4. If a predetermined code is to be determined, for example, the presence of a bit adjacent plates 42*a*-1 and 42*a*-3 but not at 42*a*-2 and 42*a*-4, then switch section 98-1 would be set up accordingly. The same holds true with respect to switches 98-2 and 98-3 which set the input patterns of the respective comparators 90-2 and 90-3.**

Each comparator produces an output only if the bits sensed by the respectively connected detectors 72 match up with the pattern set in by the respectively connected switches 98. Since the three comparators are connected in series the logic of the circuits produce an output signal on an output line 100 only if the inputs to the three comparators from the respective detectors match the respective signal patterns set in by the switches 98. It should be understood, of course, that as many of the comparators as desired connected in series or in series parallel, or in parallel, to accommodate more than the twelve bits of the record which are illustratively shown herein.

The comparator output line 100 is connected to an inverter 102 which in turn feeds one input of a NAND gate 104. The other input of NAND 104 is from amplifier 94 so that NAND 104 can be conditioned only when switch 96 is closed to energize the comparators 90. The output of NAND 104 is supplied to another inverter 106 whose output is connected to the base input of each of reject circuit transistors 108, 110. A buzzer, or other alarm device, 112 is connected to the collector of transistor 108. The buzzer receives voltage from the positive source. An indicator lamp 114, shown as the neon type, is connected to the collector of the second transistor 110. The emitters of both transistors 108 and 110 are grounded. Transistor 110 and the lamp 114 give a visual indication of a reject and transistor 108 and buzzer 112 give an audible indication.

An accept transistor 118 has its base connected to the comparator output line 100 by a resistor 120. Base bias is provided by a resistor 122 connected to the positive voltage source. The emitter of transistor 118 is grounded and the collector is connected to a neon lamp 122. One terminal of each of the neon lamps 114 and 112 is connected through a resistor 124 and a diode 126 to an AC source of any suitable construction.

The operation of the circuit is described below. The "number" to be accepted, that is, the correct bit pattern on the record, is set into the comparators 90 by the switches 98. Switches 98 can be of any suitable type, for example, thumb wheel switches. Also, a keyboard can be utilized and, if desired, the number entered into the comparators for comparison displayed on the keyboard as it is entered.

The record 10 is placed in nest 34 and laid onto the sensor platen 40 and the cover 38 is closed and the appropriate detectors 72 are actuated to produce respective output signals indicating that a bit has been detected. Two situations are possible. The first is where the pattern of output signals (the binary number) from the detectors 72 into the comparators 90 corresponds to the number set into the comparators and the second is where the pattern does not.

Considering the first situation, where the binary number sensed from the record matches that set into the comparator, the comparator produces a high output signal on line 100. This high signal is applied to the base of transistor 118 causing it to conduct and light lamp 122. This means that the record is acceptable. This is, its binary number matches the number set into the comparators. At this time, both transistors 108 and 110 in the reject circuit are blocked since the high signal on line 100 is inverted in amplifier 102 blocking NAND 104.

In the second case, where the comparison of the number on the record and that set into the comparators is not the same, the output signal on line 100 is low. Therefore, transistor 118 will not conduct. The low signal is inverted by the inverter 102 and taken with the signal from amplifier 94, which is also a high signal, conditions NAND 104 to produce a low signal at its output which is inverted in amplifier 106 which will turn on both transistors 108 and 110. This will cause the buzzer to sound and the light 114 to be lit. This means that the record is not acceptable.

It should be understood that the decoder of the subject invention has several advantages. First of all, its logic circuit is very simple. It can be extended to include any number of bits merely by increasing the number of detectors and providing a corresponding number of stages in the comparators. As a further possibility, for example to double the capacity of the system, the detectors can be alternately switched between sets of bits by a suitable switching arrangement and the output of each of the comparators can be stored until the comparison is completed.

It should be recognized that the sensing of the information is done without any movement between the record and the sensing plates and/or detectors. That is, the entire sensing process is taking place with the record stationary. This provides a considerable advantage over other prior art arrangements, such as magnetic strips, wherein the record must be moved relative to a sensing head in order to produce an ouput voltage. Further, the decoder does not require any circuits which are responsive to magnetic material. In addition, the sensor platen is of uniquely constructed in that it uses a side-by-side plate configuration, with the plates 42 and the center strip 44 all in one plane, rather than two plates which are located one above the other. This results in a sensor platen which is easier and less costly to manufacture. Also, it makes it easier to insert and to accurately read the record since it eliminates the problem of positioning a record between two plates with the proper amount of pressure and permits a simple cover and latching arrangement to be used to hold the record in place.

The decoder of the present invention has numerous uses. For example, it can be used in a toll-gate taking device wherein the acceptable number for the record carrier can be changed on a daily, weekly, monthly, or yearly basis. Other applications include toll booths, turnstiles, applications where the security is changed on a daily basis, etc.

What is claimed is:

1. A decoder comprising:

means for producing a radio frequency signal, sensor platen means for supporting a record of the type having a pattern of spaced electrically unconnected bits of information thereon of a material which can electrically couple the radio frequency signal and in which said bits are covered by an electrically non-conductive material, said sensor platen means including a common first means for receiving the signal from the signal producing means and a plurality of second means adjacent but spaced from the first means in the same plane, each of said second means being located adjacent said first means so that a bit present on the record will bridge the first means and a respective second means to electrically couple the signal from said first means to a second means which is bridged by a bit, and means electrically coupled to said second means for detecting the signal coupled from said first to said second means.

2. A decoder as in claim 1 wherein said plurality of second means are located adjacent to a side of said first means.

3. A decoder as in claim 1 wherein said first and second means of said sensor platen comprises plates of electrically conductive material on a printed circuit board.

4. A decoder as in claim 1 wherein said first means of said sensor platen is an elongated plate of electrically conductive material and each of said second means of said sensor platen comprises a separate plate of electrically conductive material, said plates of said second means arranged alongside of and spaced from said elongated plate of said first means.

5. A decoder as in claim 1 further comprising a housing for holding said sensor platen and means on said housing for holding a said record in position on said sensor platen.

6. A decoder as in claim 5 further comprising cover means adopted for resting on a second record when in place on said sensor platen.

7. A decoder comprising:

means for producing a radio frequency signal, sensor platen means for supporting a record of the type having a plurality of spaced and electrically unconnected bits of information thereon in a predetermined pattern with the bits being of a material which can electrically couple the signal and with the bits covered by an electrically non-conductive material, said sensor platen means including a common first means for receiving the signal from the signal producing means and a plurality of second means adjacent the first means and arranged in a pattern to accommodate all possible patterns of the bits on the record so that the signal on said first means will be electrically coupled by a bit on said record in the corresponding pattern position to the respective second means, and means electrically coupled to said plurality of second means for detecting the signals coupled by a bit from said first means to a respective one of said second means.

8. A decoder as in claim 7 wherein said first means of said sensor platen is an elongated plate of electrically conductive material and each of said second means of said sensor platen comprises a separate plate of electrically conductive material, said plates of said second means arranged alongside of and spaced from said elongated plate of said first means.

9. A decoder as in claim 7 wherein said detecting means further comprises means responsive only to a predetermined pattern of bits on the record for producing a first output signal.

10. A decoder as in claim 9 wherein said detecting means further comprises means for selectively establishing the predetermined pattern of bits on the record to which the detecting means is to respond to produce the first output signal.

11. A decoder as in claim 9 wherein said detecting means includes means responsive to a pattern of bits on the record of other than said predetermined pattern for providing a second signal.

12. A decoder as in claim 10 wherein said detecting means includes means responsive to a pattern of bits on the record of other than said predetermined pattern for providing a second signal.

13. A decoder as in claim 10 wherein the predetermined pattern of bits selected corresponds to a binary number.

14. A decoder as in claim 7 further comprising means for holding the record stationary with respect to the sensor platen as the detecting means operates.

15. A decoder as in claim 7 wherein said detecting means comprises a detector circuit means responsive to the radio frequency energy coupled from the first means to a respective second means by a bit.

16. A decoder as in claim 15 wherein there is a separate decoder circuit means coupled to each of said second means.

17. A decoder as in claim 9 wherein said means for producing said first output signal comprises comparator circuit means for comparing the signals coupled to the respective ones of said second means by the bits on the record with a preset group of signals corresponding to a predetermined pattern on the record.

* * * * *